2,933,514
NEW DERIVATIVES OF TESTOSTERONE

Poul Borrevang, Vanlose, Copenhagen, Denmark, assignor to Lovens Kemiske Fabrik Ved A. Kongsted, Ballerup, Denmark No Drawing. Application November 17, 1959
Serial No. 853,446

Claims priority, application Great Britain
November 19, 1958

6 Claims. (Cl. 260—397.4)

This invention relates to new and therapeutically useful derivatives of testosterone, which derivatives have the general formula:

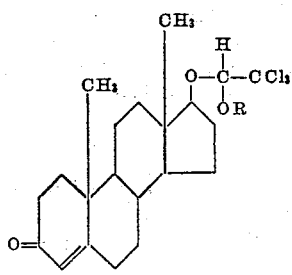

in which R is selected from the group consisting of hydrogen, and the following acyl groups: formyl, acetyl, propionyl, butyryl, and isobutyryl. Thus, the said derivatives are testosterone-chloral-hemiacetal and certain esters thereof. It has been found that in aqueous suspensions these compounds are capable of exerting androgenic and anabolic effects which are substantially higher than the same effects of the propionate and the isobutyrate of testosterone.

Testosterone-chloral-hemiacetal is very sparingly soluble in water, and in contact with water, it is decomposed into testosterone and chloral. For this reason aqueous suspensions of testosterone-chloral-hemiacetal are not suitable as saleable pharmaceutical preparations. When it is desired to apply such suspensions for therapeutical purposes they should preferably be prepared immediately before use. The esters of the said hemiacetal are likewise very sparingly soluble in water, but are stable in contact with water. They show more protracted biological effects of the said kind than the esters of testosterone itself. Thus, for example, in aqueous suspensions the acetate of testosterone-chloral-hemiacetal shows more protracted androgenic effect than testosterone isobutyrate. The initial, as well as the protracted, effects of the acetate, the propionate, and the isobutyrate of testosterone-chloral-hemiacetal decrease in the sequence in which they are mentioned here.

The difference in activity between testosterone-chloral-hemiacetal and testosterone propionate has been determined by tests according to the method described by Eisenberg and Gordan in Journal of Pharmacology and Experimental Therapeutics, vol. 99 (1950), page 38. The test animals, castrated male rats, received daily, during 8 consecutive days, one subcutaneous injection of an aqueous suspension containing varying amounts of the one or the other of the two compounds to be tested, whereafter the weight of levator ani as well as of prostata plus vesiculae seminalis were determined and compared with the weight of the same parts of control animals. The results of the tests are specified in the following table in which the figures in the columns A–E have the following meanings:

A—The amounts of the two compounds in mg. injected daily per kg. body weight of the test animal.
B—The difference in mg. between the average weight of levator ani of ten animals after administration of testosterone propionate and that of the ten control animals.
C—The same difference after administration of testosterone-chloral-hemiacetal.
D—The difference in mg. between the average weight of prostata plus vesiculae seminalis of ten animals after administration of testosterone propionate and that of the ten control animals.
E—The same difference after administration of testosterone-chloral-hemiacetal.

TABLE I

| A | B | C | D | E |
|---|---|---|---|---|
| 20 | 21 | 37 | 113 | 231 |
| 10 | 12 | 36 | 58 | 210 |
| 5 | 10 | 24 | 33 | 110 |
| 2.50 | ---- | 10 | ---- | 86 |
| 1.25 | ---- | 3 | ---- | 33 |

Androgenic steroid compounds are preferably administered by intramuscular injections of aqueous suspensions of the crystalline steroid compound. Thereby, protracted physiological effects can be obtained, and the degree of protraction depends upon the size of the crystals. In commercially available aqueous suspensions of crystalline testosterone isobutyrate a particle size of $100\mu$ secures a suitable initial, maximum, and protracted effect.

It has been found that aqueous suspensions of the esters of testosterone-chloral-hemiacetal, in which the particle size is about $10\mu$, besides a satisfactory initial and maximum effect, produce a more protracted effect than that which can be obtained with aqueous suspensions of crystalline testosterone isobutyrate having a particle size of $100\mu$. This superiority of the said esters has been ascertained by comparative tests applying the method described by Kupperman et al. in Acta Endocrinogica, vol. 16 (1954), page 109. In this method the growth-promoting effect on the accessory sex glands of castrated male rats is used as a measure of the androgenic activity. The rats were divided in groups of 10 animals, and each animal received a single injection containing 2.0 mg. of testosterone isobutyrate or testosterone-chloral-hemiacetal acetate, both substances in the form of aqueous crystalline suspensions in which the particle size was $100\mu$ and $10\mu$, respectively. The animals were killed 4, 7, 14, and 21 days after the injection, and the weight of prostata plus vesiculae seminalis was determined as the average weight of the glands from each group of 10 animals. The results are specified in Table II.

TABLE II

| | Weight in mg. of prostata + vesiculae seminalis | | | |
|---|---|---|---|---|
| Days | 4 | 7 | 14 | 21 |
| Testosterone-isobutyrate | 90.3 | 131.9 | 229.1 | 87.9 |
| Testosterone-chloral-hemiacetal acetate | 120.2 | 231.9 | 325.6 | 207.7 |
| Control | ---- | 30.4 | ---- | 39.4 |

By using a particle size of only 10μ the suspension more easily passes through the canula, and pains at the injection spot are diminished to such a degree that it is possible to omit an addition of a local anesthetic to the suspension.

Testosterone-chloral-hemiacetal can be produced by reacting testosterone with chloral, preferably at room temperature as described in Example 1. The reaction can also be carried out at elevated temperatures, for example at the boiling point of the reaction mixture. When the reaction is carried out at the boiling point, the chloral can be replaced by chloral hydrate. The esters of testosterone-chloral-hemiacetal with acids having two or more carbon atoms can be produced by reacting the said hemiacetal with the anhydride of the acid in question. The formiate of testosterone-chloral-hemiacetal can be produced by reacting the hemiacetal with the mixed anhydride of formic acid and acetic acid.

Example 1

*Testosterone-chloral-hemiacetal.*—2.9 g. of testosterone were mixed at room temperature with a solution of 1.7 g. of anhydrous chloral in 10 ml. of anhydrous benzene. By shaking the mixture for a few minutes a clear solution was obtained, and after some further few minutes a solid precipitate was formed. The precipitate was filtered off, washed with benzene, and dried at room temperature. Thereby, 2.5 g. of a product with melting point 194–196° C. were obtained, which was purified by recrystallization from ethyl acetate. The recrystallized testosterone-chloral-hemiacetal had M.P. 200–201° C. The ultraviolet spectrum showed a maximum at 241 m$\mu$, $\epsilon$=16,300, in ethanol.

Calculated: C, 57.87%; H, 6.71%; Cl, 24.41%. Found: C, 57.62%; H, 6.70%; Cl, 24.61%.

Example 2

*Testosterone-chloral-hemiacetal.*—2.9 g. of testosterone were mixed with 1.4 g. of anhydrous ethanol, 10 ml. of anhydrous benzene, 25 mg. of p-toluenesulphonic acid, and 4.5 g. of anhydrous chloral, and the mixture was boiled with reflux for 2 hours and subsequently cooled to room temperature. Thereafter, 5 ml. of a 5% aqueous solution of potassium hydroxide and 50 ml. benzene were added, and the aqueous phase was separated from the organic phase. The latter was washed 3 times with water, whereby 300 mg. of a solid substance separated. The organic phase was dried with $Na_2SO_4$ and thereafter evaporated to dryness in vacuo on a water bath. The dry crystalline residue was triturated with ethyl acetate, the mixture was filtered, and the filter cake dried at room temperature. Thereby, 1.8 g. of testosterone-chloral-hemiacetal were obtained with M.P. 189–190° C.

Example 3

*Testosterone-chloral-hemiacetal.*—A solution of 4.8 g. of testosterone in 18 ml. of chloroform was mixed with a solution of 4.0 g. of chloral hydrate and 120 mg. of benzoyl peroxide in 13 ml. of chloroform, and the solution was boiled with reflux for 2 hours and subsequently cooled to room temperature. Thereafter, the solution was washed 3 times with a dilute aqueous solution of sodium chloride, dried with $Na_2SO_4$, and evaporated to dryness in vacuo on a water bath. The crystalline residue was triturated with ether, and the solid material was filtered off and dried at room temperature. Thereby, 1.9 g. of testosterone-chloral-hemiacetal were obtained with M.P. 190–193° C.

Example 4

*Testosterone-chloral-hemiacetal.*—A solution of 4.8 g. of testosterone in 18 ml. of chloroform was mixed with a solution of 3.6 g. of anhydrous chloral and 130 mg. of benzoyl peroxide in 12 ml. of chloroform, and the mixture was boiled with reflux for 2 hours and subsequently cooled to room temperature. Thereafter, the solution was washed 3 times with a dilute aqueous solution of sodium chloride, dried with $Na_2SO_4$, and evaporated to dryness in vacuo on a water bath. The crystalline residue was triturated with ether, and the solid material was filtered off and dried at room temperature. Thereby, 2.6 g. of testosterone-chloral-hemiacetal were obtained with M.P. 192–194° C.

Example 5

*The acetate of testosterone-chloral-hemiacetal.*—3.0 g. of testosterone-chloral-hemiacetal were dissolved in a mixture of 10 ml. of acetic acid anhydride and 10 ml. of pyridine. The solution was left standing at room temperature for 16 hours and subsequently evaporated to dryness in vacuo on a water bath. The residue was triturated with ether, whereafter the solids were filtered off, washed with ether, and dried. Thereby, 2.9 g. of the desired acetate were obtained with M.P. 191–192° C. After recrystallization from ethyl acetate the M.P. was 192–193° C. The ultraviolet spectrum showed a maximum at 241 m$\mu$, $\epsilon$=16,400, in ethanol.

Caculated: C, 57.81%; H, 6.54%; Cl, 22.26%. Found: C, 57.69%; H, 6.61%; Cl, 22.46%.

Example 6

*The propionate of testosterone-chloral-hemiacetal.*—3.0 g. of testosterone-chloral-hemiacetal were dissolved in a mixture of 10 ml. of propionic acid anhydride and 10 ml. of pyridine. The solution was left standing at room temperature for 16 hours and was thereafter evaporated in vacuo on a water bath to an oily material, which after a while crystallized. Petrol ether was added and the crystals were filtered off and dried. Thereby, 1.9 g. of the desired propionate were obtained with M.P. 150–151° C. After recrystallization from methanol the M.P. was 151–152° C. The ultraviolet spectrum showed a maximum at 240 m$\mu$, $\epsilon$=17,200, in ethanol.

Calculated: C, 58.60%; H, 6.76%; Cl, 21.63%. Found: C, 58.55%; H, 6.74%; Cl, 21.59%.

Example 7

*The isobutyrate of testosterone-chloral-hemiacetal.*—3.0 g. of testosterone-chloral-hemiacetal were dissolved in a mixture of 10 ml. of isobutyric acid anhydride and 10 ml. of pyridine. The solution was left standing at room temperature for 16 hours, and was thereafter worked up as described in Example 6. Thereby, 1.8 g. of the desired isobutyrate were obtained with M.P. 126–127° C. After recrystallization from methanol the M.P. was 127–128° C. The ultraviolet spectrum showed a maximum at 242 m$\mu$, $\epsilon$=17,200, in ethanol.

Calculated: C, 59.35%; H, 6.97%; Cl, 21.03%. Found: C, 59.41%; H, 7.21%; Cl, 21.03%.

Example 8

*The formate of testosterone-chloral-hemiacetal.*—2.8 ml. of formic acid were mixed with 7.5 ml. acetic acid anhydride, and the mixture was left standing for 24 hours at room temperature. Thereafter, a solution of 3.0 g. of testosterone-chloral-hemiacetal in 15 ml. of anhydrous pyridine was added, and the mixture was left standing for 5 hours at room temperature and subsequently evaporated to dryness in vacuo on a steam bath. The solid residue was triturated with ether and the solid material filtered off, washed with ether, and dried. Thereby, 2.7 g. of the desired formate were obtained with M.P. 232–234° C. (decomposition). After recrystallization from acetone the M.P. was 239–241° C.

I claim:
1. Testosterone derivatives having the general formula:

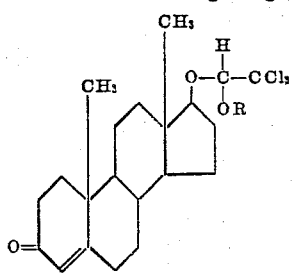

in which R is selected from the group consisting of hydrogen, formyl, acetyl, propionyl, butyryl, and isobutyryl.
2. Testosterone-chloral-hemiacetal.
3. The formate of testosterone-chloral-hemiacetal.
4. The acetate of testosterone-chloral-hemiacetal.
5. The propionate of testosterone-chloral-hemiacetal.
6. The iso-butyrate of testosterone-chloral-hemiacetal.

No references cited.